Oct. 27, 1942.  W. L. GROENE  2,299,976
ORBITAL LATHE FEED MECHANISM
Filed June 30, 1941
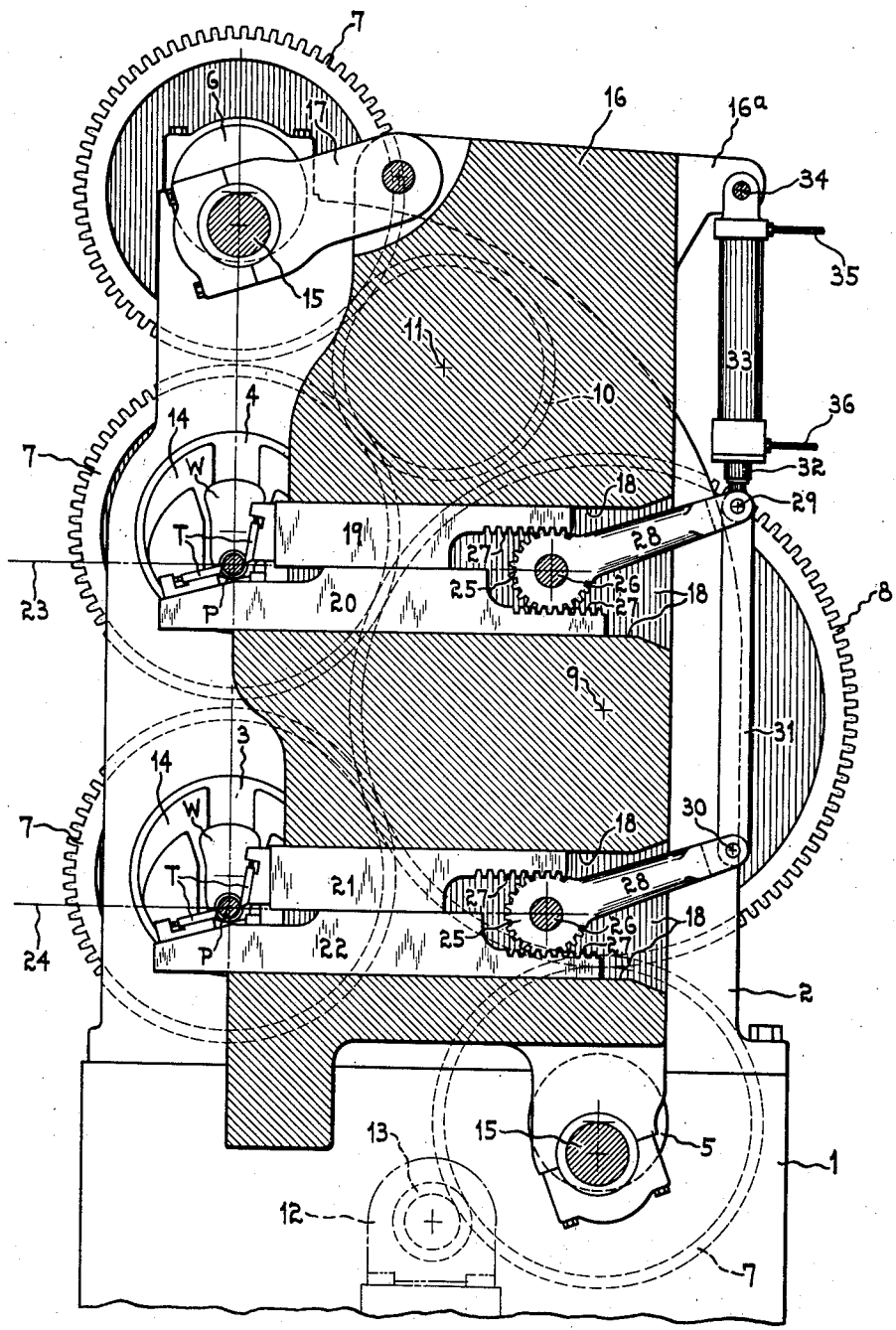
INVENTOR
Willard L. Groene

UNITED STATES PATENT OFFICE 2,299,976

ORBITAL LATHE FEED MECHANISM

Willard L. Groene, Cincinnati, Ohio, assignor to The R. K. Le Blond Machine Tool Company, Cincinnati, Ohio, a corporation of Delaware Application June 30, 1941, Serial No. 400,397.

3 Claims. (Cl. 82—9)

This invention pertains to tool feeding mechanism for orbital lathes and is particularly related to multiple spindle type orbital lathes in which the crank pins of a plurality of crankshafts are to be turned simultaneously in orbital fashion.

One of the chief objects of this invention is to provide a simplified tool feeding arrangement capable of feeding tools from opposite sides to each crank pin of a plurality of crankshafts to be turned simultaneously.

Another object of this invention is to provide in an orbital lathe having an orbital tool carrying unit, and a plurality of work spindles; a plurality of tool feeding devices, feeding from opposite directions for each work spindle which are adapted to apply cutting tools relative to the crank pins of the crankshaft to be machined, and to provide on the orbital tool carrying unit, a common source of power for rendering all of said tool feeding devices operable simultaneously during the orbital operation of the tool carrier and work spindles of the lathe.

Further features and advantages of this invention will appear from the detailed description of the drawing in which:

The drawing shows a diagrammatic cross section through a typical orbital lathe having an orbital tool carrier and a plurality of work spindles, particularly showing the tool actuating bars and the power mechanism for actuating these bars carried by the orbital tool carrier unit.

For purposes of an exemplary disclosure, this invention is shown applied to a typical orbital lathe of a type, for example, as shown in Reissue Patent 18,662, issued November 22, 1932, in which the machine has a base 1 and upright work housing 2, in which are mounted the work spindles 3 and 4. In the base 1 is provided the lower master crankshaft 5 and in the upper portion of the upright housing 2 is journaled the upper master crankshaft 6. The work spindles 3 and 4 and these master crankshafts 5 and 6 each have identical gears 7 fixed on them and rotatable therewith. The gears 7 on the work spindles 3 and 4 and lower master crankshaft 5 are interconnected in synchronous driving rotation by means of a suitable idler gear 8 appropriately journaled at 9 in the housing 2. The gears 7 on the upper master crankshaft 6 and work spindle 4 are likewise interconnected in proper synchronous rotation by means of the idler gear 10 appropriately journaled in the housing 2 at 11. The gear 7 on the lower master crankshaft 5 is driven from the suitable spindle drive motor 12 through its pinion 13 so that all of the work spindles and master crankshafts are rotated in proper synchronous movement for effecting the cutting speed of the work pieces W carried in the chucking devices 14, fixed on the work spindles 3 and 4.

On the crank pins 15 of the master crankshafts 5 and 6, is journaled the orbitally moving tool carrier 16, directly on the lower master crankshaft 5 and through the link 17 to the upper master crankshaft 6, in the conventional manner as set forth for example in Reissue Patent 18,662.

In this carrier 16 is horizontally slidably mounted in suitable guideways 18 formed in the body of the unit, a pair of tool bars 19 and 20 associated with the work spindle 4 and another pair of tool bars 21 and 22 associated with the lower work spindle 3. On each of these tool bars 19—20 and 21—22, are appropriate cutting tools T operating on the crank pins P of the work piece W. The tool feed for the upper tool bars 19 and 20 are arranged to feed in a horizontal line of feeding 23 while the cutting edges of the tools T of the lower tool bars 21—22 are arranged to feed in the line of feeding 24, both of these lines of feeding being parallel to each other.

Mechanism for actuating these tool feeding bars in feeding motion comprises segmental pinions 25 suitably journaled on studs 26 fixed in the tool carrier, which engages racks 27 formed on the tool bars. Formed integrally with the pinion 25 are lever arms 28 which are connected together by suitable pins 29 and 30 by means of the interconnecting link 31. In this way, both of the lever arms 28 and their associated pinions 25 are actuated simultaneously in exact motion and through the medium of the racks 27 actuate the tool bars 19 and 20 and 21 and 22 simultaneously in appropriate feeding motion. The pin 29 is connected to a piston rod 32 of the hydraulic feed cylinder 33 pivotally mounted by a suitable pin 34 on a projecting lug 16a of the tool carrier 16. Suitable fluid conducting lines 35 and 36 provide means for applying fluid pressure, through a suitable flexible conduit as conventionally done in such mechanisms, for operating the piston rod 32 of the cylinder whereby the downward motion of the piston rod 32 effects withdrawal of the cutting tools T from the work W and where return of the piston rod 32 upwardly to the position shown in the drawing, feeds the cutting tools T to the work to proper depth.

In this way, a unique and simplified arrangement is provided for an orbital lathe in which the orbital tool carrier has no feeding movement in itself but upon which it is desired to provide tool feeding devices which are actuated by mechanism on the carrier and which are adapted to feed tools to the plurality of work spindles simultaneously and from opposite sides so as to perform machining operations on the crank pin of a plurality of crankshafts at one time while feeding cutting tools from opposite sides of the work.

Having thus fully set forth and described my invention what I claim as new and desire to secure by United States Letters Patent is:

1. In an orbital lathe, a frame, a pair of work spindles mounted vertically above one another journaled in said frame, a master crankshaft journaled in said frame, vertically above both of said work spindles so that said work spindles and master crankshafts lie substantially with their axes in a vertical plane, a second master crankshaft journaled in said frame to the rear and below said lower work spindle, interconnecting gearing between said work spindles and master crankshafts, and means for driving said gearing so as to rotate said work spindles and master crankshafts in synchronism, and an orbital tool feeding mechanism mounted on said master crankshafts.

2. In an orbital lathe, a frame, a pair of work spindles journaled in said frame one above the other, a master crankshaft journaled in said frame above said work spindles so that the axes of said work spindles and said master crankshaft lie substantially in a common vertical plane, a second master crankshaft journaled in said frame to the rear and below said lower work spindle, gearing on said work spindles and master crankshafts, an idler gear interconnecting the gearing on said upper work spindle with the master crankshaft located above said work spindle, and an idler gear interconnecting the gears on said work spindles and the gear on said lower rearward master crankshaft, means for driving said gearing and idler gears so as to effect simultaneous synchronous rotation of said work spindles and master crankshafts, and an orbital tool carrying unit mounted on the crank pins of said master crankshafts having cutting tools associated with each of said work spindles.

3. In an orbital lathe, a frame, a pair of work spindles journaled in said frame one above the other, a master crankshaft journaled in said frame, all of said work spindles and said master crankshaft having their axes lying in a vertical plane, a second master crankshaft journaled in said frame to the rear and below said lower work spindle, interconnecting gearing on said work spindles and master crankshafts, and means for driving said transmission gearing to effect synchronous rotation of said work spindles and master crankshafts, an orbitally moving tool carrier mounted on said master crankshafts, pairs of tool bars horizontally slidably mounted on said orbital tool carrier, one pair for each of said work spindles, and means on said orbital tool carrier for actuating said tool bars to effect their relative feeding motion with respect to work in said work spindles, and cutting tools on said tool bars arranged to approach and retract from said work in said work spindles from opposite sides of said work pieces.

WILLARD L. GROENE.